Sept. 28, 1948.   B. DE GRAAF   2,450,188
PUSH AND PULL LOAD GAUGE
Filed March 24, 1945
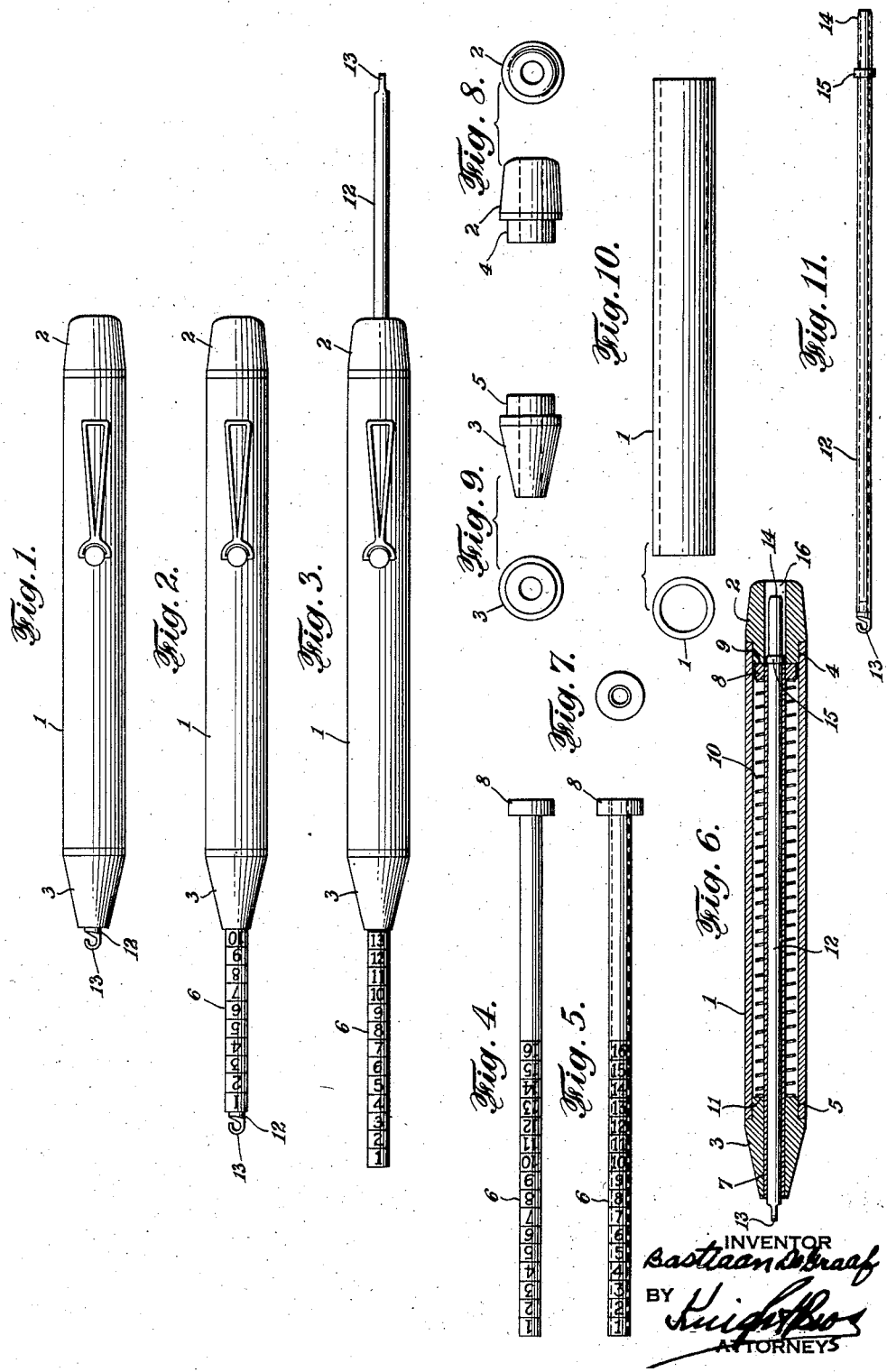
INVENTOR
Bastiaan de Graaf
BY
ATTORNEYS Patented Sept. 28, 1948

2,450,188

UNITED STATES PATENT OFFICE 2,450,188

PUSH AND PULL LOAD GAUGE

Bastiaan De Graaf, Yonkers, N. Y.

Application March 24, 1945, Serial No. 584,611

1 Claim. (Cl. 73—141)

My invention relates to a push and pull pocket gauge of shape and dimensions approximating those of a fountain pen (although it may be made slightly lighter than the ordinary fountain pen), and of design and construction to put it in the class of precision gauges for shop, field and laboratory uses.

My improved gauge comprises a cylindrical holder or body having an axially arranged scale bar, a spring controlling the scale bar, and means for controlling the position of the scale bar actuated by push or pull of the weight, pressure or tension to be measured, the invention consisting in structure and cooperation of the parts as will first be described with reference to the accompanying drawings, exhibiting a preferred form of the invention, and be then more precisely pointed out in the claim.

In the drawings—

Figure 1 is a view in side elevation of my improved gauge, with push and pull rod retracted within the casing or holder in condition for placing in the pocket; Figure 2 a similar view with the sliding scale extended by a pulling force applied thereto; Figure 3 a similar view showing the scale extended as by a pushing force; Figure 4 an elevation of the scale rod detached from the assembly; Figure 5 a similar view showing the opposite side of the scale rod from that shown in Figure 4; Figure 6 an axial sectional elevation of the gauge assembly as shown in Figure 1; Figure 7 an elevation of the rear end of the scale rod; Figure 8, end and side views of the upper or top piece of the holder; Figure 9, similar views of the lower end piece; Figure 10 an end elevation and side view of the center piece of the holder; and Figure 11 a side elevation of the push-pull rod detached.

The holder or body of the gauge comprises the central hollow cylinder 1 and end pieces 2 and 3, the latter having reduced inner ends as at 4 and 5, of dimensions and contour to seat within the ends of the cylinder 1, the contiguous exterior portions of body and plugs being flush to exhibit smooth and uninterrupted or "streamline" surfaces in imitation of the streamlining of a pocket pen giving the instrument a like facility to that of a fountain pen in putting the gauge in or taking it from the vest pocket. The body and end pieces are preferably of plastic or other insulating material and securely fastened together, and together form a convenient vest-pocket-size holder for the operating parts of the gauge.

The gauge bar 6 is a hollow cylindrical member, preferably of aluminum, dimensioned to slide and be guided at one end portion in the straight axial guideway 7 of the lower end piece 3 of the holder, and at the other end having an annular flange 8 seated against an annular shoulder 9 of the end piece 2 against the other side of which rests one end of a helical spring 10, whose other end engages the annular shoulder 11 of the end piece 3, the spring being normally under such unit compression between the members 9 and 11 as to hold the scale bar retracted with the projectable end of the hollow scale bar flush with or slightly within the outer edge of the guide passage 7, but when the spring is compressed by pressure applied to one end, the projectable end of the scale bar projects beyond the end of the nose piece 3, and the amount of resistance or weight to be measured is exhibited by the extent of projection of the scale bar beyond the guide 7 against the spring resistance. This projection of the scale bar is brought about by a pull-push rod 12, preferably a thin-walled tube of brass, shown detached in Figure 11, having at one end a pull member in the form of a hook 13 and at the other a blunt-ended push member 14. On the pull-push rod, near one end and rigid therewith, is a flange 15, either side of which contacts with the flanged end of the scale bar—the rod being reversible for that purpose. When the hook end is entered in the axial opening 16 at the flanged end of the scale bar and pushed through until the flange 15 contacts with the end of the scale bar, a pulling strain may be measured by connecting the then projecting hook 13 to the part whose resistance or weight is to be determined, as shown in Figure 2. If the blunt end of the rod is inserted in the guide aperture 16 so that the pull-push rod flange 15 contacts with the flanged end of the scale bar, a pushing strain or weight can be measured by forcing in the pull-push bar until the spring pressure balances that of the weight or force to be measured, as shown in Figure 3.

The marks and figures of the scale on one side of the scale bar are duplicated on the opposite sides of the scale bar and are individually inverted on opposite sides, enabling the user to select the row of figures which appear upright with the gauge in any position.

The gauge can be used as a weighing scale as well as a gauge to measure the tension or pressure required to pull or push movable parts within the limits of one pound (the maximum for this pocket-size construction). If the movement of parts assembled on the apparatus has to be measured, it can be done, in most cases, without dismounting any of them, as this gauge works both ways and requires but little space to reach the part to be measured. The gauge is constructed of nonmagnetic and electrically insulated materials; therefore, it will not be rendered inaccurate by magnetic forces, and the user will be free from shock when the pull of magnetic switches or the pressure of their contacts is to be measured. The round, free-turning sliding scale is equally graduated in ounces or other units all around and plainly numbered on two opposite sides with the figures in the one row placed in reverse of the figures in the other row, as previously explained. The gauge operates with a minimum amount of friction, is dust-proof, and requires no lubrication.

The spring 10 not only serves as a balance spring in cooperation with the scale bar to precisely measure the resistance or force to be gauged, but acts, when the pull-push rod is released, to restore the projected members to their hidden seat within the holder, which is restored to its streamlined appearance and function. By the adoption of a reversible pull-push rod, the compressive force of the spring can be used for gauging either in pulling or pushing.

I claim:

A push and pull load gauge having a fountain-pen-shaped tubular holder comprising a tubular cylinder, a bored insert at each end of the cylinder, the bores of the inserts being of lesser diameter than the bore of the cylinder, a tubular scale bar having an annular flange at one end extending through the bore of one insert and into the cylinder, a helical spring within the cylinder having one end bearing against one of the inserts and the other end bearing against said annular flange, a reversible push-pull bar having a flange near one end, said push-pull bar extending into the tubular scale bar with its flange bearing against the end of the scale bar adjacent the annular flange, a coupling attached to one end of the push-pull bar for connecting a load, whereby the force applied by the load to the push-pull bar will move the scale bar against the compression of the spring to give an indication of the value of the load.

BASTIAAN DE GRAAF.

REFERENCES CITED

The following references are of record in the file of this patent:

UNITED STATES PATENTS

| Number | Name | Date |
|---|---|---|
| 42,801 | Sleppy | May 17, 1864 |
| 200,708 | George et al. | Feb. 26, 1878 |
| 1,393,007 | Brown | Oct. 11, 1921 |
| 1,825,491 | Walters | Sept. 29, 1931 |
| 2,009,363 | Scheurer | July 23, 1935 |
| 2,049,532 | Williams | Aug. 4, 1936 |